US008290951B1

(12) United States Patent
Joa et al.

(10) Patent No.: US 8,290,951 B1
(45) Date of Patent: Oct. 16, 2012

(54) UNSTRUCTURED DATA INTEGRATION WITH A DATA WAREHOUSE

(75) Inventors: David Joa, Pacifica, CA (US);
Debashish Ghosh, Charlotte, NC (US);
Kurt Newman, Matthews, NC (US);
Thayer S. Allison, Jr., Charlotte, NC (US); Elaine C. Marino, Sterling, CT (US); Joy M. Tarquin, Charlotte, NC (US); Maryann Mangini, Newark, DE (US); Yanghong Shao, Charlotte, NC (US); Mark V. Krein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 367 days.

(21) Appl. No.: 12/171,024

(22) Filed: Jul. 10, 2008

(51) Int. Cl.
*G06F 7/00* (2006.01)
*G06F 17/30* (2006.01)
(52) U.S. Cl. ......... 707/736; 707/754; 707/755; 707/756
(58) Field of Classification Search .................. None
See application file for complete search history.

(56) References Cited

U.S. PATENT DOCUMENTS

| 7,003,564 | B2* | 2/2006 | Greuel et al. | 709/224 |
|---|---|---|---|---|
| 7,370,044 | B2* | 5/2008 | Mulhern et al. | 707/758 |
| 2003/0097380 | A1* | 5/2003 | Mulhern et al. | 707/200 |
| 2004/0167870 | A1* | 8/2004 | Wakefield et al. | 707/1 |
| 2005/0086360 | A1 | 4/2005 | Mamou et al. | |
| 2006/0047636 | A1* | 3/2006 | Mohania et al. | 707/3 |
| 2007/0011134 | A1* | 1/2007 | Langseth et al. | 707/1 |
| 2008/0021762 | A1 | 1/2008 | Coon et al. | |
| 2008/0306987 | A1* | 12/2008 | Chen et al. | 707/102 |
| 2009/0089341 | A1* | 4/2009 | Skaria et al. | 707/204 |
| 2009/0106271 | A1* | 4/2009 | Chieu et al. | 707/100 |
| 2009/0119246 | A1* | 5/2009 | Kansal | 707/2 |

* cited by examiner

*Primary Examiner* — Jay Morrison

(74) *Attorney, Agent, or Firm* — Banner & Witcoff, Ltd; Michael A. Springs

(57) ABSTRACT

Techniques for bridging data from business support units, e.g., call centers and marketing operations, with a data warehouse to augment and enrich pre-existing customer information. Unstructured data is received with incomplete integration information. A data key is created from the unstructured data, and the unstructured data is integrated with the structured data in a data warehouse based on the data key. Unstructured data can assume different forms of data, including recorded audio data, facial image data, and iris image data. At least one customer identifier is extracted from the unstructured data by data mining. A data key is subsequently created from the at least one customer identifier. Incomplete integration may include partial integration information or may not include any integration information.

19 Claims, 13 Drawing Sheets

| JTime | FileLength | ANI | Genesys_ID | Party_ID |
|---|---|---|---|---|
| 16:10:36 | 00:02:17 | ### xxxxxxx | #### xxxxxxxxxxxxxxxxxx | # xxxxxxx ### ## |
| 16:11:05 | 00:00:34 | ### xxxxxxx # | #### xxxxxxxxxxxxxxxxxx | ## xxxxxxxx ## |
| 16:11:22 | 00:04:54 | # xxxxx ### | #### xxxxxxxxxxxxxxxxxx | |
| 16:12:51 | 00:02:54 | ## xxxxx ### | #### xxxxxxxxxxxxxxxxxx | |
| 16:13:41 | 00:09:24 | ## xxxxx ## | #### xxxxxxxxxxxxxxxxxx | ### xxxxxx # |
| 16:15:33 | 00:11:12 | # xxxxx ##### | #### xxxxxxxxxxxxxxxxxx | xxxxxx ##### |
| 16:15:54 | 00:05:25 | ### xxxxxx # | #### xxxxxxxxxxxxxxxxxx | ## xxxxxx ### |
| 16:16:21 | 00:02:33 | # xxxxx #### | #### xxxxxxxxxxxxxxxxxx | #### xxxxx ## |
| 16:16:51 | 00:00:03 | ## xxxxxx xxx | #### xxxxxxxxxxxxxxxxxx | |
| 16:18:21 | 00:07:07 | ####### xxx | #### xxxxxxxxxxxxxxxxxx | |
| 16:18:32 | 00:02:29 | #### xxxx ### | #### xxxxxxxxxxxxxxxxxx | # xxxxx #### |
| 16:19:03 | 00:20:03 | # xxxxxxxx | #### xxxxxxxxxxxxxxxxxx | ### xxxxx ## |
| 16:19:37 | 00:00:10 | ### xxxx ## | #### xxxxxxxxxxxxxxxxxx | |
| 16:19:41 | 00:00:52 | ## xxxxxxxx | #### xxxxxxxxxxxxxxxxxx | |
| 16:19:44 | 00:00:44 | ## xxxxxx | #### xxxxxxxxxxxxxxxxxx | xxxxxxx ###### |

FIG. 5

| Party_ID | Match | Customer Name | TIN/SSN | Address | City | State | Primary Phone |
|---|---|---|---|---|---|---|---|
| PID 1 | pty_id; no ANI | Name 1 Lxxxx | ##x#xx#x# | x### Address A x ## | Anytown | AA | Phone A |
| PID 2 | pty_id; no ANI | Name 2 Lxx | xx###xxx | ##xxx Address B # | Anytown | AA | Phone B |
| PID 3 | pty_id; no ANI | Name 3 L | ####x###x# | #xx# Address C xx xxx | Anytown | AA | Phone C |
| PID 4 | pty_id; no ANI | Name 4 L | ##xx###xx# | xxx Address D xx | Anytown | AA | Phone D |
| PID 5 | pty_id; no ANI | Name 5 L | x | #x## x Address E xx | Anytown | AA | Phone E |
| PID 6 | pty_id; no ANI | Name 6 L | #x#xx##x# | #x#x x Address F xxxx | Anytown | AA | Phone F |
| PID 7 | pty_id; no ANI | Name 7 La | #xxxxx### | xx## Address G xx xx | Anytown | AA | Phone G |
| PID 8 | pty_id; no ANI | Name 8 L | ###xx## | Address H xxx xx | Anytown | AA | Phone H |
| PID 9 | No | | | | | | |
| PID 10 | pty_id; no ANI | Name 10 L | xx##x#### | Address I x x xx ##xx# # xx | Anytown | AA | Phone I |
| PID 11 | pty_id; no ANI | Name 11 L | #xxx###x# | #xx# Address J x## | Anytown | AA | Phone J |
| PID 12 | pty_id; no ANI | Name 12 L | #xxx###x# | #xx# Address K #xx | Anytown | AA | Phone K |
| PID 13 | pty_id; no ANI | Name 13 L | x###### | #x# Address L xx | Anytown | AA | Phone L |
| PID 14 | pty_id; no ANI | Name 14 L | xx##x#x#x | #x## Address M | Anytown | AA | Phone M |
| PID 15 | pty_id; no ANI | Name 15 L | ####xx## | # Address N | Anytown | AA | Phone N |
| PID 16 | No | | | | | | |
| PID 17 | pty_id; no ANI | Name 16 L | xx#x##### | x## Address O x | Anytown | AA | Phone O |

FIG. 6

| Matching Method | Incremental Unique Pty_Id Matches | Cumulative Unique Pty_Id Matches | Cumulative % Matched |
|---|---|---|---|
| Account Number (Full) | 329 | 329 | 19.17% |
| SSN (Full) | 60 | 389 | 22.67% |
| Account Number (Last 4-digit) | 0 | 389 | 22.67% |
| SSN (Last 4-digit) | 12 | 401 | 23.37% |
| Telephone Number (Full) | 21 | 422 | 24.59% |
| Telephone Number (Last 4-digit) | 0 | 422 | 24.59% |
| First Name + Last Name | 6 | 428 | 24.94% |
| First Name + Last Name + Address | 1 | 429 | 25.00% |
| First Name + Last Name + DOB | 2 | 431 | 25.12% |
| First Name + Last Name + SSN (Full) | 0 | 431 | 25.12% |
| First Name + Last Name + SSN (Last 4-digit) | 3 | 434 | 25.29% |
| Account Number (Full) + SSN (Full) | 0 | 434 | 25.29% |
| Account Number (Full) + DOB | 0 | 434 | 25.29% |
| Account Number (Full) + SSN (Last 4-digit) | 4 | 438 | 25.52% |
| Account Number (Last 4-digit) + SSN (Last 4-digit) | 82 | 520 | 30.30% |
| First Name + Last Name + Telephone Number (Full) | 0 | 520 | 30.30% |
| First Name + Last Name + Telephone Number (Last 4-digit) | 0 | 520 | 30.30% |
| Account Number (Full) + Telephone Number (Full) | 0 | 520 | 30.30% |
| Account Number (Full) + Telephone Number (Last 4-digit) | 0 | 520 | 30.30% |
| Account Number (Last 4-digit) + Telephone Number (Full) | 1 | 521 | 30.36% |
| Account Number (Last 4-digit) + Telephone Number (Last 4-digit) | 2 | 523 | 30.48% |
| SSN (Full) + Telephone Number (Full) | 0 | 523 | 30.48% |
| SSN (Full) + Telephone Number (Last 4-digit) | 0 | 523 | 30.48% |
| SSN (Last 4-digit)+ Telephone Number (Full) | 0 | 523 | 30.48% |
| SSN (Last 4-digit)+ Telephone Number (Last 4-digit) | 3 | 526 | 30.65% |
| Account Number (Last 4-digit) + SSN (Last 4-digit) + Telephone Number (Full) | 0 | 526 | 30.65% |
| Account Number (Last 4-digit) + SSN (Last 4-digit) + Telephone Number (Last 4-digit) | 1 | 527 | 30.71% |
| Account Number (Last 4-digit) + SSN (Last 4-digit) + First Name + Last Name | 0 | 527 | 30.71% |

FIG. 11

| File Name | Call Duration | Site | Agent First Name | Agent Last Name | Agent ID | Date | Call ID | Call Type | Cust First Name | Cust Last Name | DoB | Reference # | Acct # | SSN or TIN | ANI (Tele) | Cust Addr Line 1 | Cust Addr Line 2 | City | State | Zip |
|---|---|---|---|---|---|---|---|---|---|---|---|---|---|---|---|---|---|---|---|---|
| Audio File 1 | 2:55 | | NAME1 | NAME2 | | 4/23/2008 | | | Name One | | | | | | | ADDRESS1 | | CITY | ST | aaaaa |
| Audio File 2 | 3:49 | | NAME3 | NAME4 | | 4/29/2008 | | | | NAME17 | | | | | | | | | | |
| Audio File 3 | 4:10 | | NAME5 | NAME6 | | 4/23/2008 | | | Name Two | | mm/dd/yy | | | ##-###-##### | (###)###-#### | ADDRESS2 | | CITY | ST | aaaaa |
| Audio File 4 | 1:15 | | Agent 1 | Last | | 4/23/2008 | | | Name Three | | mm/dd/yy | | aaaaaaa | ##-###-#### | | | | | | |
| Audio File 5 | 8:54 | | Agent 2 | NAME7 | | 4/26/2008 | | | Name Four | | mm/dd/yy | | aaaaaa | ##-###-#### | | | | | | |
| Audio File 6 | 7:10 | | Agent 3 | NAME8 | | 4/28/2008 | | | Name Five | | | | aaaaa | | | | | | | |
| Audio File 7 | 12:25 | | Agent 4 | NAME9 | | 4/29/2008 | | | Name | | | | aaa | | | | | | | |
| Audio File 8 | 2:22 | | Agent 5 | NAME10 | | 4/29/2008 | | | | NAME18 | | | aaaaaaaaaa | | | | | | | |
| Audio File 9 | 6:17 | | Agent 6 | NAME11 | | 4/30/2008 | | | | NAME19 | | | aaaaaa | ##-###-#### | | ADDRESS3 | | CITY | ST | aaaaa |
| Audio File 10 | 7:24 | | Agent 7 | NAME12 | | 4/30/2008 | | | | NAME20 | | | aaaaaa | ##-###-#### | | | | | | |
| Audio File 11 | 7:00 | | Agent 8 | NAME13 | | 4/30/2008 | | | | NAME21 | mm/dd/yy | | aaaaa | ##-###-#### | | | | | | |
| Audio File 12 | 8:39 | | Agent 9 | NAME14 | | 4/23/2008 | | | Account Activity | NAME24 | | | | ##-###-#### | | | | | | aaaaaa |
| Audio File 13 | 3:28 | | Agent 10 | NAME15 | | 4/30/2008 | | | Account Application | NAME22 | | | | | | | | | | |
| Audio File 14 | 5:05 | | Agent 11 | NAME16 | | 4/24/2008 | | | | NAME23 | dda | | | | | | | | | |

1200

1201 — Example 1 - When SSN, ANI, Acct # are not Available Use Audio Recording to Extract Name, Address as a Combinational Key to Map Back to the Data Warehouse 1203 — Example 2 - When Only SSN and Partial Name is Available Use Audio Recording to Extract SSN and Partial Name to Construct Data Key with SSN First and Partial Name to Verify Customer Name on Data Warehouse 1205 — Example 3 - SSN, Name, Acct #, DoB are Available in Audio Recording Use Audio Recording to Extract All Available Data Keys to Map to the Data Warehouse

FIG. 12

UNSTRUCTURED DATA INTEGRATION WITH A DATA WAREHOUSE

FIELD OF THE INVENTION

Aspects of the invention generally relate to bridging data from business support units with a data warehouse to augment and enrich pre-existing customer information. In particular, unstructured data is integrated with structured data.

BACKGROUND

Data integration progresses at a different pace at a corporate level, depending on the business units and industry. Industries that are intensive data and information users, e.g., financial services and retail businesses, have processes and methods in place to ensure that information from a central data repository (data warehouse) is made available to different point-of-sale, business support units, and branches.

The availability of information from a data warehouse often occurs as a one-way flow: from the data warehouse to the end-points where information is needed to service customers. The one-way end-point can be a point-of-sale terminal, branches, business support unit's data mart, and the like.

The converse of a one-way movement of data is a two-way movement of data, which is typically not supported by the prior art. Data that flows from a data warehouse to a business support unit, for example, remains locked in the business support unit. All the while, new customer interactions and data are recorded, captured, and stored in local servers without the capability or process in place to bring this enriched data contained in a business support unit back to the data warehouse (the round trip of the data).

Data integration, in the context of call center operations and systems and in accordance with prior art, is typically confined to efforts to bring enterprise-level data to a localized server in a call center in order to create a unified view of a customer relationship for agents who handle calls. This unified view starts as a data extract or as a direct data feed from a central data repository to individual servers or clusters of servers in a call center.

As another example, one-way data flow may occur in banking centers. Typically, banking center system platforms query Systems-of-Records (SOR) via Application Programming Interface (API) or via direct query of stored customer data when a customer is authenticated by a teller. The data flows from the SOR to the teller screen to enable customer servicing. A transaction generates structured data that flow back to the SOR and data warehouse. However, unstructured data, e.g., conversations and images captured, typically do not flow back to the SOR and data warehouse.

BRIEF SUMMARY

Aspects of the invention address one or more of the issues mentioned above by disclosing methods, computer readable media, and apparatuses for bridging data from business support units, e.g., call centers and marketing operations, with a data warehouse to augment and enrich pre-existing customer information. Bridged data may include audio and image data.

With another aspect of the invention, unstructured data is received with incomplete integration information. A data key is created from the unstructured data, and the unstructured data is integrated with the structured data in a data warehouse based on the data key. Unstructured data can assume different forms of data, including recorded audio data, facial image data, and iris image data.

With another aspect of the invention, at least one customer identifier is extracted from the unstructured data by data mining. A data key is subsequently created from the at least one customer identifier.

With another aspect of the invention, only partial integration information is known. The partial integration information is merged with at least one customer identifier to obtain a data key. The created data key is utilized to integrate the unstructured data with the structured data.

With another aspect of the invention, none of the integration information is known. At least one customer identifier, which is obtained from data mining of unstructured data, is matched in order create a data key. The created data key is utilized to integrate the unstructured data with the structured data.

Aspects of the invention may be provided in a computer-readable medium having computer-executable instructions to perform one or more of the process steps described herein.

These and other aspects of the invention are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which:

FIG. 5 shows an exemplary output from a call center with native computer telephone integration (CTI) information in accordance with an aspect of the invention.

FIG. 6 shows an exemplary output with call center data merged with warehouse customer data in accordance with an aspect of the invention.

FIG. 11 shows an example of unstructured data from a collection of calls that are matched by different data elements in accordance with an aspect of the invention.

FIG. 12 shows exemplary scenarios for merging data from a business support unit with data from a data warehouse in accordance with an aspect of the invention.

DETAILED DESCRIPTION

In accordance with various aspects of the invention, methods, computer-readable media, and apparatuses are disclosed in which data is bridged from business support units, e.g., call centers and marketing operations, with a data warehouse to augment and enrich pre-existing customer information. Bridged data may include audio data, image data, category of call or customer interaction (e.g., account servicing, account closure, and complaints), and contextual analysis keywords. Unstructured data may be received with incomplete integration information. A data key is created from the unstructured data, and the unstructured data is integrated with the structured data in a data warehouse based on the data key. Unstructured data can assume different forms of data, including recorded audio data, facial image data, and iris image data.

Figure 1:
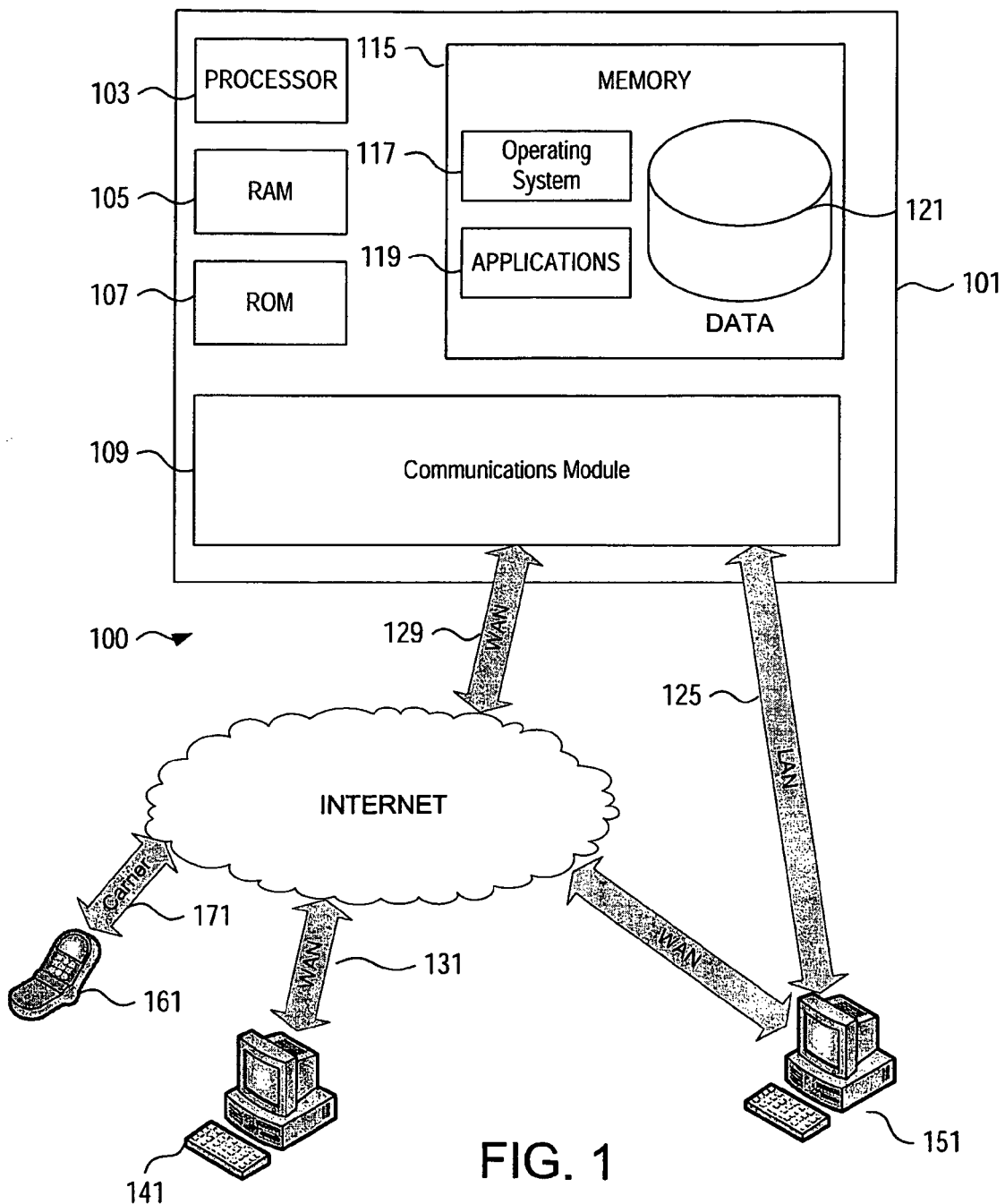
FIG. 1 shows an illustrative operating environment in which various aspects of the invention may be implemented.
Figure 3:
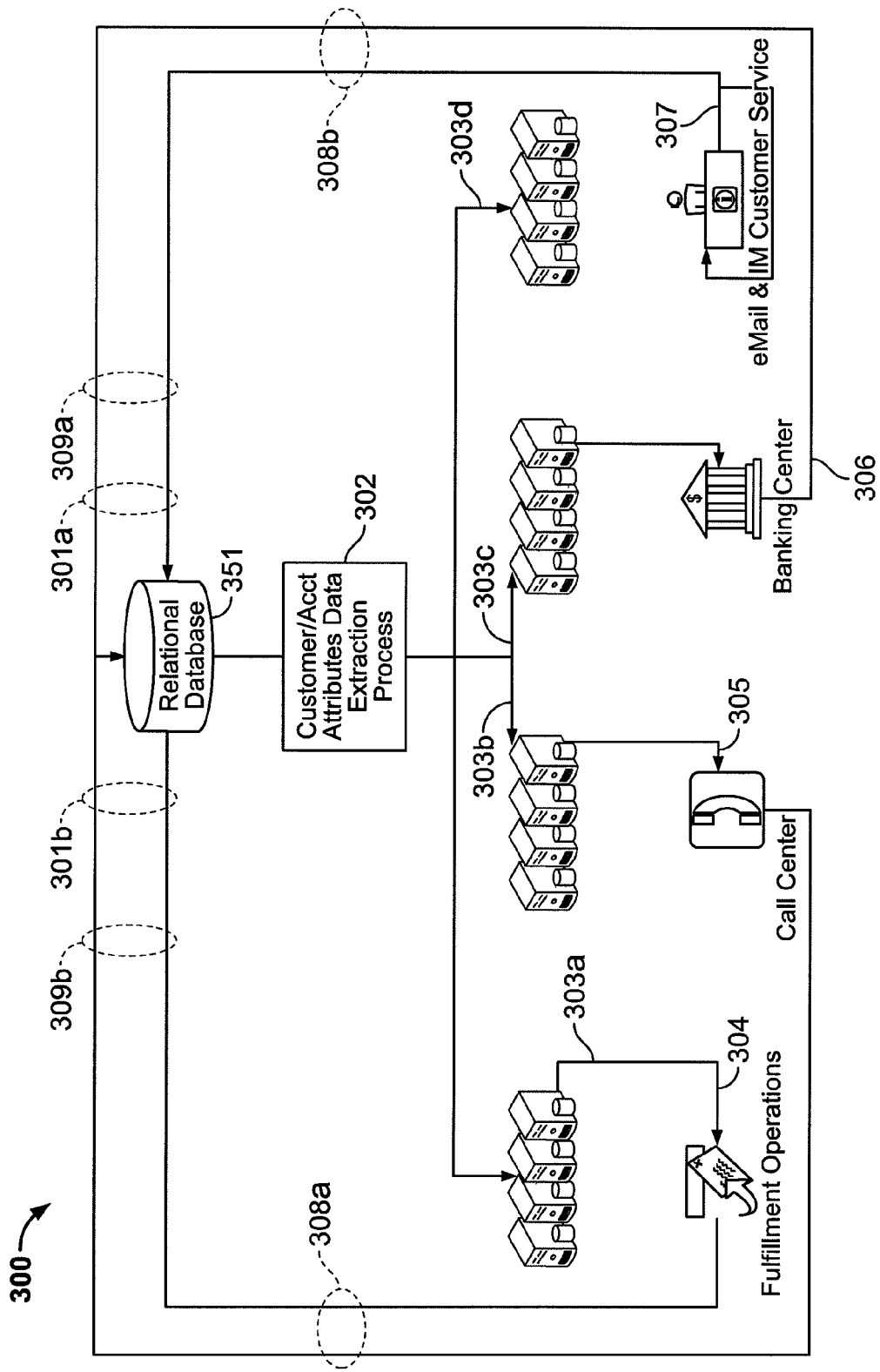
FIG. 3 shows a system that integrates customer interaction data with a data warehouse in accordance with an aspect of the invention.
Figure 4:
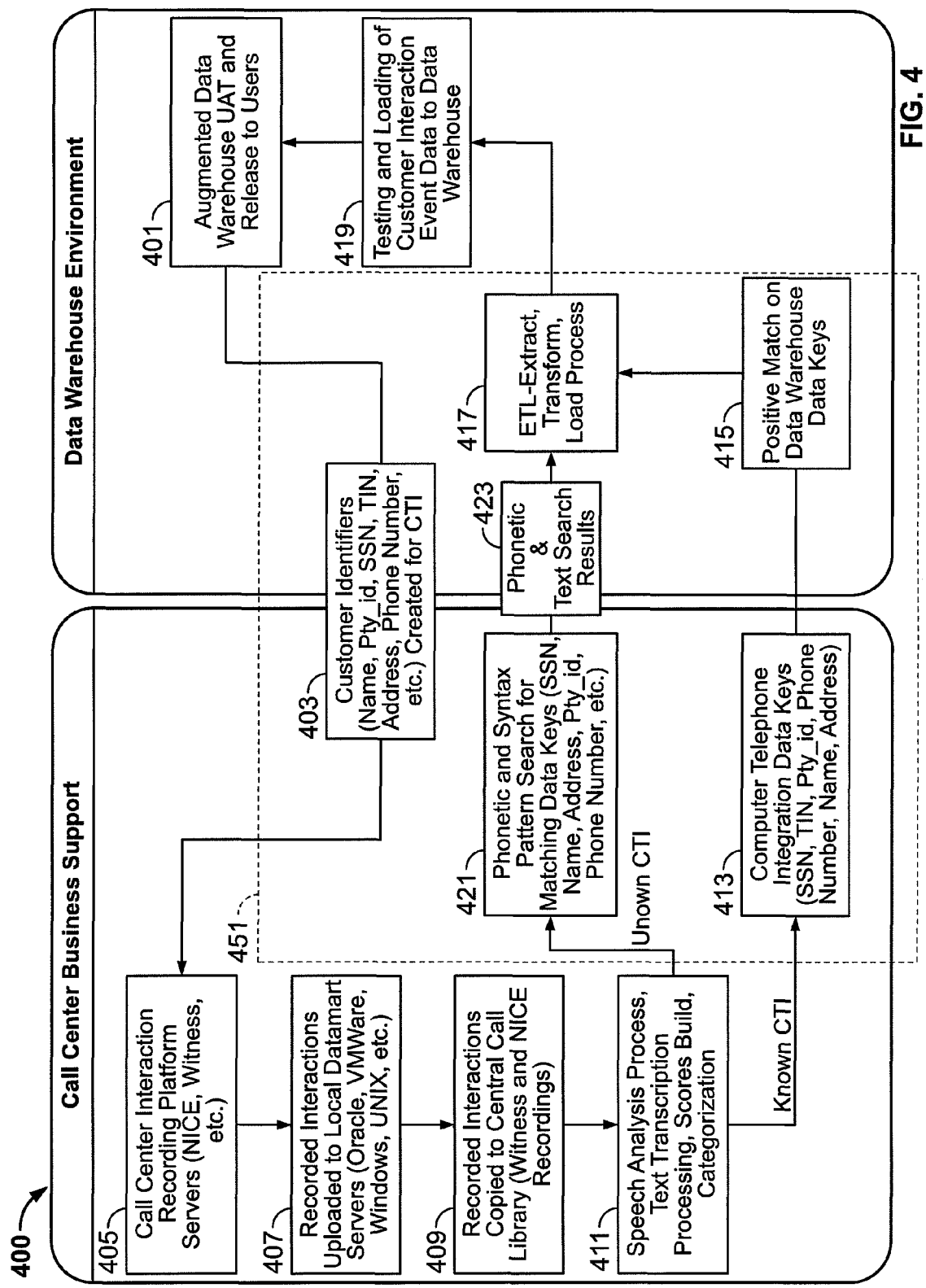
FIG. 4 shows a process for integrating data from a call center with a data warehouse in accordance with an aspect of the invention.

Even though business entities can exchange structured data with business support units freely, aspects of the invention are directed to unstructured data so that unstructured data can be bridged with the structured environment. Data can be destroyed in addition to being locked away in business support units. For example, operational processes may retain only a certain amount of data before purging; thus, data may not flow back to the data warehouse environment FIG. 1 illustrates an example of a suitable computing system environment 100 (e.g., for executing system 300 as shown in FIG. 3 and process 400 as shown in FIG. 4) that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, and the like to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Communications module 109 may include a surface device (not shown) that interacts with the user through the surface of an ordinary object, rather than through a monitor and keyboard. Users can interact with the machine by touching or dragging their fingertips and objects such as paintbrushes across the screen, or by setting real-world items tagged with special bar-code labels on top of it. Communications module 109 may include additional input devices (not shown), e.g., a closed circuit TV (CCTV) and surveillance cameras at an automated teller machine (ATM) to account for iris and facial images.

A surface device is typically a multi-touch, multi-channel device having a horizontal display on a table-like form. The surface device typically has a screen that can incorporate multiple touches and thus uses them to navigate multimedia content. The surface device may use fingers' electrical properties to detect touch and may further utilize a system of infrared cameras to detect input. Uploading digital files may only require each object (e.g., a Bluetooth-enabled digital camera) to be placed on the surface device. People can physically move around the picture across the screen with their hands, or even shrink or enlarge them.

As an example, a surface device may include a processor, a memory a graphics card, a scratch-proof spill-proof surface, a projector, and a collection of infrared cameras that are distributed around the surface in order to provide a multi-touch, multi-channel user interface to a user. For example, a user may place a driver's license on the surface to identify the user and subsequently place a credit card or check on the surface to provide payment for an item.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of pre-clearance information or trading information for security equities in different jurisdictions.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Branch computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 is connected to the LAN 825 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
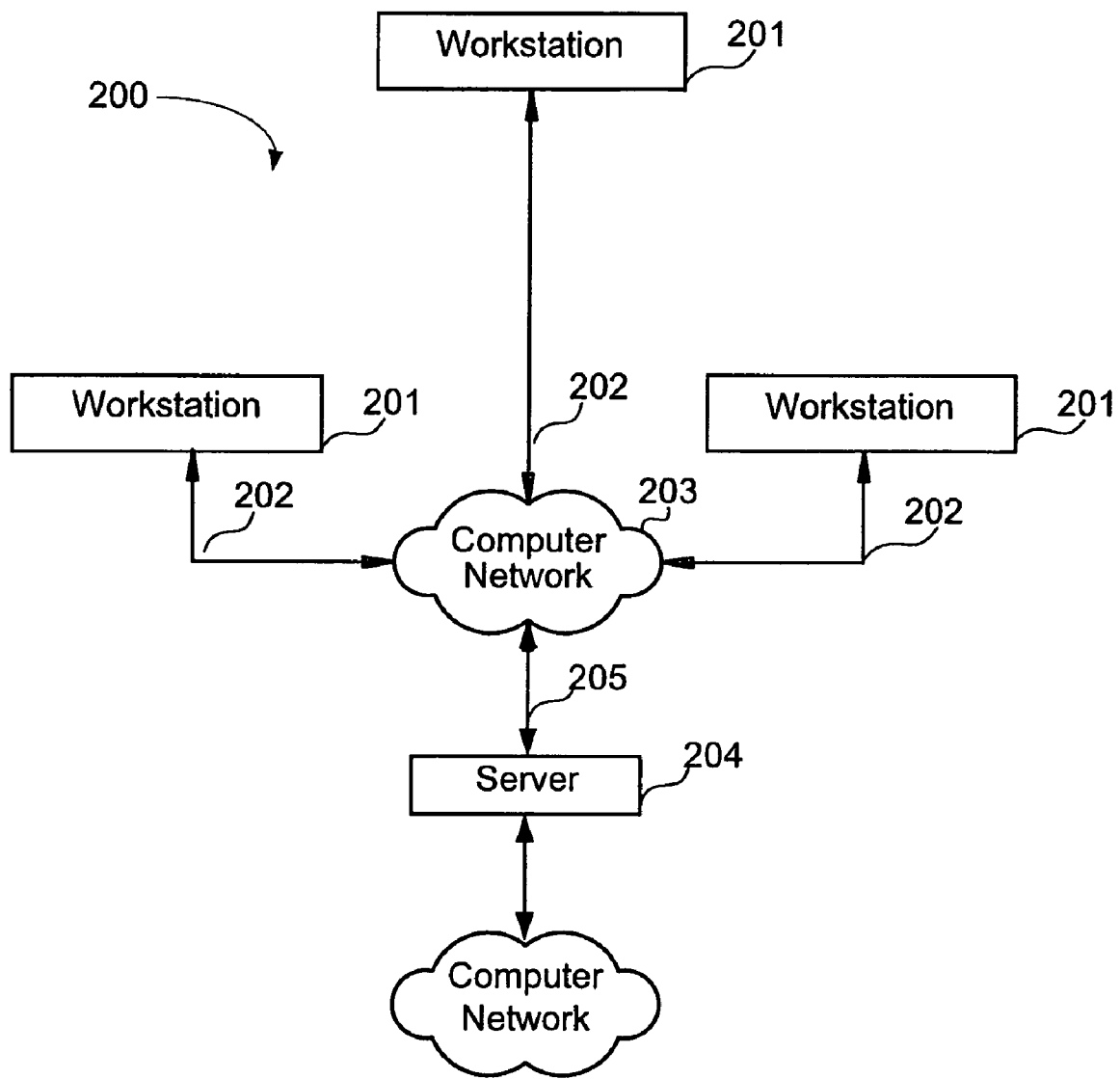
FIG. 2 is an illustrative block diagram of workstations and servers that may be used to implement the processes and functions of certain aspects of the present invention.

Referring to FIG. 2, an illustrative system 200 for implementing methods according to the present invention is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like. Connectivity may also be supported to a CCTV or image/iris capturing device.

As understood by those skilled in the art, the steps that follow in the Figures may be implemented by one or more of the components in FIGS. 1 and 2 and/or other components, including other computing devices.

In the discussion herein, data is categorized as either structured data or unstructured data. Unstructured data is defined as data that cannot be categorized or arranged in a logical manner. For example, mapping everyday conversations between a customer and a teller is unstructured because the dialogue is by nature unstructured. Similarly, image data (e.g., scanned facial data or scanned eye iris information) is considered as unstructured data. However, aligning customer name with customer account number is an example of structured data.

Automatic number identification (ANI) is a feature of telephony intelligent network services that permits subscribers to display or capture the telephone numbers of calling parties. In the United States it is part of Inward Wide Area Telephone Service (WATS). The ANI service was created by AT&T for internal long distance billing purposes and is not related to newer caller ID services. Inward WATS is typically purchased by customers so that other telephone users (for example, prospective customers) can call the number toll free. The customer is issued a distinctive toll-free telephone number beginning with a special area code such as 800, or more recently, 888, 877, or 866. Subscribers to these numbers are typically called Inward WATS subscribers.

A related piece of information conveyed to the Inward WATS subscriber is the Dialed Number Identification Service (DNIS), the number that the caller dialed when accessing the service. With the information, the service provider can have several toll-free numbers directed to the same call center and provide unique service based on the number dialed. DNIS can also be used to identify other call routing information. For example, the WATS service can be configured to send a specific DNIS number that is assigned to callers from geographic regions based on city, area code, state, or country.

Computer telephony integration (CTI) is technology that allows interactions on a telephone and a computer to be integrated or co-coordinated. As contact channels have expanded from voice to include email, web, and fax, the definition of CTI has expanded to include the integration of all customer contact channels (voice, email, web, fax, and the like) with computer systems.

Data integration is the process of combining data residing at different sources and providing the user with a unified view of these data. This process emerges in a variety of situations both commercial (when two similar companies need to merge their databases) and scientific (combining research results from different bioinformatics repositories). Data integration appears with increasing frequency as the volume and the need to share existing data explodes. It has been the focus of extensive theoretical work and numerous open problems remain to be solved. In management practice, data integration is frequently called Enterprise Information Integration.

Data mart is a subset of an organizational data store, usually oriented to a specific purpose or major data subject that may be distributed to support business needs. Data marts are analytical data stores designed to focus on specific business functions for a specific community within an organization. Data marts are often derived from subsets of data in a data warehouse, although in the bottom-up data warehouse design methodology the data warehouse is created from the union of organizational data marts.

A data warehouse is a centralized repository of electronic data available to users in an enterprise capacity. The types of data included in a data warehouse are determined by the individual business unit's needs and generally contain sufficient information to service the needs of Marketing, Risk, Operations, Reporting, and Analysis groups.

Extract, Transform, and Load (ETL) is a process in data warehousing that may include:
  extracting data from outside sources,
  transforming it to fit business needs (which can include quality levels)
  loading it into the end target, i.e. the data warehouse.

FIG. 3 shows system 300 that integrates customer interaction data with a data warehouse in accordance with an aspect of the invention. FIG. 3 depicts customer information stored in individual business support units that is associated with data stored in a centralized data warehouse. In order to associate the customer information from the business support units with data stored in the data warehouse, system 300 either obtains data match keys from captured and recorded customer interactions or from pre-existing data match keys available in the data warehouse environment and in the business support units data environments.

System 300 bridges source data from business support units and distribution channels (e.g., call centers, banking centers, marketing operations) with a data warehouse to augment and enrich pre-existing customer information. The emergence of web technologies (e.g., blogs, wikis, VoiP), wireless communication device usages, and broad adoption of biometrics as a form of identification, creates a convergence of polymorphic data sources with high intrinsic value. In order to data mine this emerging class of data (often comprising unstructured data), the data must first be brought into a normalized environment that can enable the mapping of information with the appropriate individuals. Aspects of the invention focus on two aspects of bridging the emerging class of data:
  Building a data bridge to integrate the emerging data class with a data warehouse
  Disseminating the mined data at various distribution channels and for multiple business purposes The emergence of a new class of data (unstructured data) provides an opportunity for companies and analysts to build entirely new and unique information management processes to data mine the information.

Spoken conversation offers a rich vein of insights valuable to businesses. During the course of a business day, call centers often receive thousands of calls from bank customers and prospective customers with varied business needs.

The proliferation of user-generated web content (as a result of Web 2.0) is creating a rich venue of information generated by customers, prospects, and competitors. The user-generated information takes many forms by way of wiki's, blogs, interactive web-pages, personal profiles on social networks, and so forth. Data mining this source of unstructured information often requires the building of a data bridge that can marry the content to the customer/prospect/competitor to a data warehouse.

With an aspect of the invention, capabilities in the online banking space may be leveraged to enable the integration of unstructured web data with the data warehouse. With online banking and mobile banking as a base capability, other forms of data bridging methods can be applied to enable data integration.

The prevalent and ubiquitous use of emails and instant messaging also creates opportunities for extracting business insights from these unstructured forms of data. The exchange of electronic communications between customers and associates is a source of rich business insights that would add value to an enterprise data warehouse if the right data bridge is used to integrate the information. Exchanges of emails and instant messages related to customer complaints, account opening, account maintenance questions, general dialogue, and so forth can be analyzed holistically at the customer level when integrated in a data warehouse environment.

System 300 may utilize telephony equipment and recording technology to randomly record conversations between business associates and callers for training, product improvements, and service improvements purposes. The availability of call telephony integration (CTI) data enables the merging of customer and call statistics with other data sources.

During interactions between customer and agent where no CTI information is available or no customer information is provided, other means of customer information extraction exist. For example, telephony recording equipment enables system 300 to capture the sound of the conversation. Speech analysis can further identify audio patterns that reflect customer data, e.g., account number, social security number, tax ID number, name, address, and so forth to create a data bridge to integrate call center recordings with the data warehouse.

Video and audio capturing equipment are often deployed at various points within banking center environments for the purposes of deterring criminal activities, e.g., at teller stations, at the automated teller machine (ATM), at points of entry, and so forth. Moreover, captured video images may assist in the authentication of customers for various business activities in order for business associates to provide a more personalized service when interacting with the customers. As described herein (e.g., FIG. 11), system 300 bridges captured images to a data warehouse in order for analysts to properly associate images to appropriate customers.

Referring to FIG. 3, the data warehouse refreshes database 351 with new data in accordance with standard data processing during events 301a and 301b. With standard data processing, structured data is stored in database 351. However, as discussed herein, system 300 can also store unstructured data in database 351.

When a business support unit (e.g., call center, banking center, fulfillment operations, or e-mail/instant messaging (IM) customer service) processes a transaction for a customer (corresponding to event 302), data is extracted from the warehouse in accordance with customer and account attributes (e.g., party identification).

Operational support units of a business may include customer survey centers, email marketing and email service units, instant messages service units, fulfillment centers, and call centers.

During events 303a-d, data warehouse customer information is available to a requesting business support unit's data mart. A data mart can assume different forms. For example, NICE Systems supports an emotion-sensitive software and call monitoring-systems for security organizations and corporations. A data mart may support card operations in the credit card and debit card space and may maintain proprietary banking center operations.

A single customer view available at customer point of contact is available at a fulfillment center, call center, banking center, or e-mail/IM customer service corresponding to events 304, 305, 306, or 307.

During events 308a-b, customer event and customer information is captured and integrated with the data warehouse from a business support unit data mart. Data may be stored, extracted, and transformed as described herein.

During events 309a-b, processed data from business support units are integrated into the data warehouse.

System 300 supports the linkage or bridging of data contained in the data warehouse with data contained in a call center, distribution channels, and other business support units' data marts. By bridging unstructured data with stored data in the data warehouse, system 300 can unify and integrate every day conversation, email interaction, and instant messaging between customers and service agents with structured data that is stored in the data warehouse.

With an aspect of the invention, analysts may have the capability to unlock the intrinsic business value of dialogue with customers by marrying this information to more readily available data available on the data warehouse. For example, speech and text dialogue can be associated with a customer profile, transaction history, product ownership, and prior marketing contact history data to create a more complete view of a customer. Also, the facial image or iris image of a customer may be captured during a visit to a banking center and may be associated with the visit/event.

FIG. 4 shows process 400 for integrating data from a call center with a data warehouse in accordance with an aspect of the invention. Aspects of invention include:
  Data and systems integration
  Data enrichment in a data warehouse environment
  Operational process design
  Business applications of unstructured data post-enrichment in a data warehouse environment With an aspect of the invention, integration of data is provided by gathering information at the source (voice, images, transaction, and the like) with an identifiable data key to assign to the appropriate record in a data warehouse environment. Process 400 supports the option of utilizing several data keys independently or in association with other data keys in order to build a high level of confidence during the matching process. Different data elements, e.g., social security number (SSN), name, address, account number, telephone number, fabricated data keys (such as pty_id), and the like, can be useful for data integration purposes.

Aspects of the invention support different forms of unstructured data, including biometric data. Biometric data may span different data to identify a customer. For example, travelers who board at an airport must pass screening stations where several forms of identification are inspected, including iris scanning, voice recognition, and the like. In addition, certain security systems control access levels with biometrics technology (fingerprint, palm print, facial recognition, DNA, and the like).

Process 400 may utilize voice recordings and images captured as data bridges where appropriate. For example, conversations recorded in a call center can be measured to quantify the amplitude and frequency of sound waves of a customer voice. The specific measurements can be used to map unstructured information to the customer data in a data warehouse environment each time a customer contacts a call center to request account services. According to an aspect of the invention, a data key can be created from the characteristics of the recorded voice signal.

Similarly, in a banking center environment, the images captured via closed circuit monitoring cameras can also provide images of customers, as well as, iris images. These images may then become the data bridge to which customer interaction and unstructured data captured in a banking center or ATM (with a camera) can be integrated with other customer information in the data warehouse environment.

Data enrichment may occur in various manners, including augmentation of a data repository with new sources of data, addition of processed scores and synthetic values through statistical analyses, cleansing of pre-existing data, and creation of new data sources from derived values.

With an aspect of the invention, a data integration key is created where unstructured data can be mapped correctly to corresponding structured data. The matching process may rely on data keys available throughout data environments, distribution channels, and operations center. Data elements such as SSN, TIN, name, address, account number, telephone number, and fabricated data keys (pty_id) may be useful in the data enrichment efforts.

Business support units may have the appropriate technology and equipment to capture customer interaction and events when a bank customer calls to conduct business with a phone agent. The conversation and pertinent customer information are recorded and stored locally within the business support unit's servers.

Process 400 collects unstructured data derived from customer interactions. Examples of the unstructured data include conversations between customers, prospects, and associates through various channels (email, instant messages, telephone conversations, banking center interactions, and the like) for different purposes (survey solicitations, direct marketing campaigns, collections and fraud prevention).

Once unstructured data is integrated in a data warehouse environment, system 300 may analyze the raw data to unlock the business value, thus enriching the amount of data and information content at various levels: account level, customer level, household level, portfolio level, and the like. Various process improvements methods may be used, including Six Sigma, Total Quality Management and ISO (International Organization for Standardization).

With an aspect of the invention, different measurements may be used to gauge the effectiveness of integrating unstructured data with structured data in the data warehouse:
  Consistency or repeatability
  Accuracy in the method for building a data bridge capable of migrating to and from a data warehouse environment, distribution channels, and other operational support units of a business
  Availability of the integrated and processed data Aspects of the invention may utilize currently available technology and data processing to build an infrastructure to support a two-way data exchange method between a data warehouse and business support units. Aspects of the invention may improve pre-existing data integration methods and may create a secure, accurate, and replicable data bridge to join data from a data warehouse to data contained in servers located in business support units.

The data bridge may consist of elements readily available and common in a data warehouse environment and business support unit environment including (either as standalone, all, or in combination):
Social Security Number
Tax ID number
Name (first, last, middle)
Address of residency or Address of Business
Account Number
Online ID
Online Password
Telephone Number
ANI (Automatic Number Identification)
Party ID and Party Collection ID (unique to BAC—a fabricated customer identifier)
Driver license
Passport Number
Other government-issued identification methods
Other fabricated identifiers
Partial SSN, partial TIN, partial account number (e.g., last four digits) and any combination of these individual elements Additionally, other methods for extracting some or all of the above-referenced data elements can be used to map unstructured data with corresponding customer information. Examples include, audio recordings, images captured via closed-circuit monitoring, fingerprint, and the like.

Some or all of the data elements may be obtained from customer interactions. Information flowing from the data warehouse to populate servers in the business support units may contain some of this information. For example, a party ID and/or account number may be associated with a customer record in the call center. A customer image or an iris image captured in a video surveillance camera in a banking center may also function as unique identifiers of an individual, thus enabling the mapping of integration of data.

In a call center environment, a customer calling to conduct business may need to verify his/her identity by revealing one or more of these data elements. Since calls can be recorded in call centers, the recordings can be played back to extract the data that would associate a caller to a call, and ultimately, to a data bridge linking this customer interaction (the call) to a data warehouse.

Referring to FIG. 4, in step 401 the data warehouse refreshes with updated data and new sources. In the following scenario, system 300 supports a call center by relating computer telephony integration (CTI) information from a call with structured data in the data warehouse.

In step 403, data warehouse data key elements (customer identifies including name, pty_id, SSN, TIN, address, phone number) are constructed for each customer and passed to business support units' servers. In step 405, data key elements are uploaded to local servers to construct CTI information to map a customer to a phone number, name, SSN, address, party_id, and the like. If possible, a call is associated with a known CTI at the time that the customer provides a positive identification. In step 407, recorded interactions (audio and/or video) are uploaded to the local data mart server.

In step 409, the CTI information is associated with the contact event and stored in a local server for loading into a centralized call library or interaction library keyed by the CTI information for each customer call/interaction.

In step 411, vendor software that is housed in a central library or central server processes each recorded interaction to create a transcript, analysis, score, and identification of a successful phonetic and semantic match.

Steps 403, 413, 415, 417, 421, and 423 represent data bridge 451 to the data warehouse. Data bridge 451 is created from known CTI information by decrypting and associating each event to a customer and corresponding data key (SSN, name, address, phone number, TIN, party_id, and the like). In the cases where no CTI exists or no valid data key exists (step 421), the vendor solutions creates data bridge 451 from the successful matching of phonetic or semantic searches (from transcripts) to locate name, address, SSN, TIN, party_id, account number, and the like.

In step 417, the final ETL (Extract, Transform, and Load) process brings data captured in the business support units to the data warehouse (after Q/A and UAT (User Acceptance Testing) completes successfully). Data normalization is a standard step in the ETL process and usually refers to the 'cleansing' aspect of data manipulation. For example, SSN and TIN are numbers that can be converted into either characters or retain its numeric format. Similarly, name, address, state, and the like have varying length. For example, 'CALIFORNIA' may be standardized to be all capitals with only 2 characters 'CA' and the word 'Street' may be standardized as either 'STREET' (all capitals) or 'St.'

With steps 401, 403, 405, 407, 409, 411, 413, 415, 417, 419, 421, and 423, process 400 provides:
Builds a data bridge to link with a data warehouse using known data contained in servers in business support units.
Extracts the information needed to build a data bridge to link with a data warehouse using customer interaction data (recorded calls and emails, visits to a banking center, and so forth).

With an aspect of the invention, process 400 captures and integrates unstructured data from various sources, including:
calls recorded in call centers
instant messages exchanged between customers and service agents
Interaction captured in video surveillance in a banking center or ATM
Interaction captured in an audio recorder in a banking center or ATM
User-generated content published on the web
Survey results delivered to customers
Other emerging technologies in development that would be used during a customer engagement event (such as a portable tablet or ultra lightweight computer) to record customer feedback With the capability to migrate locally-available sources of information to the data warehouse, the owner of process 400 has a more robust, complete, and relevant data to generate better insights from analyses, more relevant products and services to meet the needs of a broader customer audience, and more predictive risk models to help optimize risks. Aspects of the invention augment the data warehouse with more direct sources of customer information and insights via a two-way data bridge between data warehouse and business support units' data marts.

Process 400 may provide several benefits to the owner of process 400, including:

Unlocking the value of customer interaction analytics at the customer and customer contact event level: With the addition of customer contact history and customer interaction at the contact level, analysts may be able to unlock insights from analysis of customer interactions. These new sources of data from business support units' data marts may not be currently readily available at the individual customer and event level. To build a data bridge that brings this information from the source to the data warehouse creates significant value for the company when insights from everyday interactions are used to make better business decisions resulting in better products, improved services, and reduced risks.

Reduction in operating costs: Maintaining information in a centralized repository may reduce the operating expenses from hardware, software, and maintenance costs. Data that is captured, stored, and maintained at each business support unit requires substantial investment to create the manpower, process, and methods to service and maintain. With a centralized repository of data, portions of the data capture, processing, and storage costs at the business support unit level could be eliminated to free up resources for alternative business investments. While not all operating and maintaining expenses can be eliminated, aspects of the invention will free up archival costs, as well as, reduce the number of records in storage at the local level.

Business support unit's personnel may have more complete access to enterprise-level data: Enriching the data warehouse with source data from business support units is not only beneficial to analysts who rely on information from a data warehouse to complete analyses; support unit's personnel also benefit from having access to the data warehouse's enriched data. Business support units' personnel can create a more panoramic view of a customer profile, history, and the like in order to tailor service for each individual customer Reduction in fraud and losses: With more accurate and timely updates of customer information, the owner of process 400 may be in a position to recognize fraud events much sooner than currently possible. New data elements in the form of customer images, voices, and the like could portent valuable authentication mechanisms. Additionally, the capability of bringing these emerging data classes to the data warehouse environment opens new capabilities for analysts and business users of data.

Process 400 may provide several benefits to the customer of process 400, including:

More personalized services and product offerings: Once information about particular customer contact events area available to analysts and support staff, customers ultimately can expect to receive better services provided by the bank as a result of the company being able to deploy better products and services customized to each customer. Additionally, knowing a customer contact history and context of the contact, provides very useful background information to associates who interact with customers to create a more personalized level of service.

Speedier problem resolution: With the availability of more complete customer profiles and history, service associates and bank personnel will have more context prior to interacting with a customer. Prior contacts, outcomes, and concerns are recorded and made available to associates who interact in person with customers. Thus, the search for context in a conversation and problem resolution is expedited; leading to faster arrivals at solutions.

Fraud prevention: Having a complete and accurate view of a customer can help reduce fraud events. Customers will benefit from the owner of process 400 providing accurate authentication with the integration of unstructured data. In this manner, information normally associated with a customer (account number, SSN, address, and the like) can be supplemented with additional data validation points, such as image of the customer face, iris, voice, and the like.

FIG. 5 shows exemplary output 500 from a call center with native computer telephone integration (CTI) information in accordance with an aspect of the invention. Unstructured data (corresponding to a voice recording assigned Genesys_ID 503 from the call center is integrated based on ANI 501 and party ID 505. Having both ANI and Party ID may enhance the precision of the match. For example, an ANI may have multiple Party ID's associated with it.

FIG. 6 shows exemplary output 600 with call center data merged with warehouse customer data in accordance with an aspect of the invention. With each data entry, ANI, full or partial SSN/TIN, address, and/or customer name is known. The individual elements may be used independently or in conjunction with each other to build a more precise algorithm.

Figure 7:
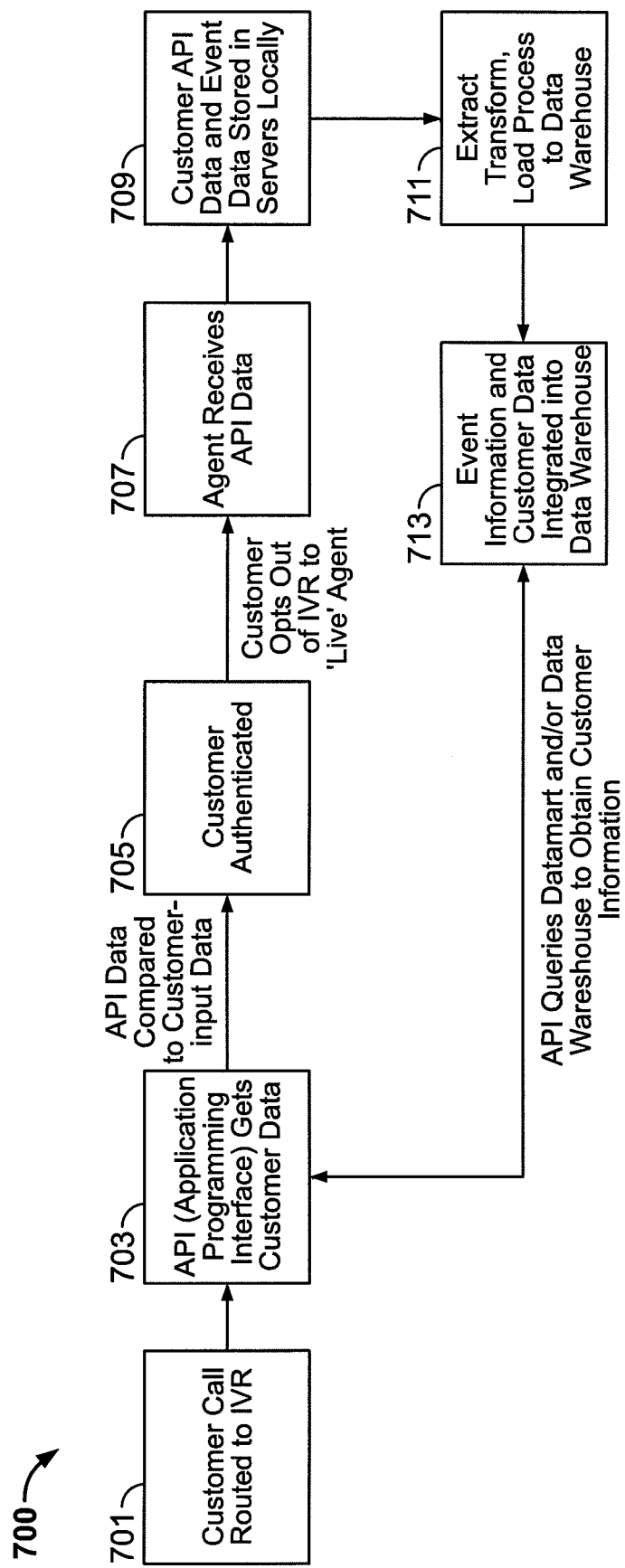
FIG. 7 shows a process for integrating data from a business support unit with data from a data warehouse when computer telephone integration information is available in accordance with an aspect of the invention.

FIG. 7 shows process 700 for integrating data from a business support unit with data from a data warehouse when computer telephone integration information is available in accordance with an aspect of the invention. In the processes shown in FIGS. 7, 8, and 9, a customer is routed to an interactive voice response system in steps 701, 801, and 901, respectively. Customer data (e.g., ANI and party_id) is provided through an applications programming interface (API) in step 703 and verified in step 705. In the scenario shown in FIG. 7, the customer requests an interaction with an agent in step 707. Unstructured data (e.g., a voice recording between the customer and the agent) is integrated into the data warehouse in steps 709, 711, and 713.

Figure 8:
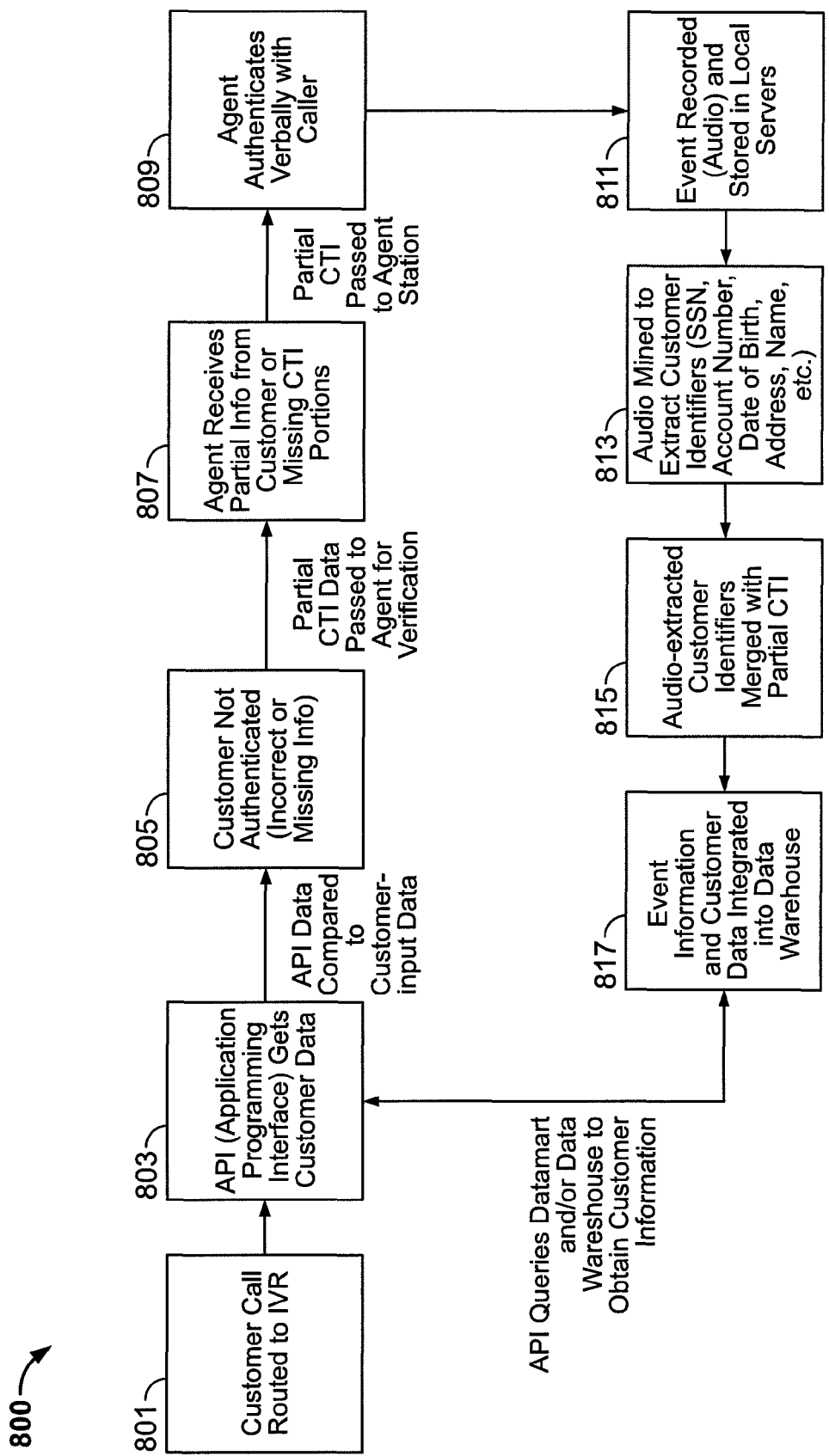
FIG. 8 shows a process for integrating data from a business support unit with data from a data warehouse when incomplete computer telephone integration information is available in accordance with an aspect of the invention.

FIG. 8 shows process 800 for integrating data from a business support unit with data from a data warehouse when incomplete computer telephone integration information is available in accordance with an aspect of the invention. Process 800 is similar to process 700; however, the customer information (CTI data) is determined to be incomplete in steps 803 and 805. The agent receives partial CTI data in step 807 and verifies the incomplete CTI data with the caller in step 809. Agents can request verbal authentication via full and partial customer identifiers (CTI). For example, some agents routinely request customers to provide full account numbers while other agents only require the last four-digits of account numbers and/or SSN in combination with other identifiers (e.g., address, account password, and the like). The recorded conversation between the agent and the customer is stored in a local server in step 811. The stored data is data mined in step 813 to obtain customer identifiers. In step 815, the mined customer identifiers are merged with the partial CTI data to uniquely identify the customer so that the unstructured data can be integrated by associating the unstructured data with the structured data in the data warehouse in step 817.

Figure 9:
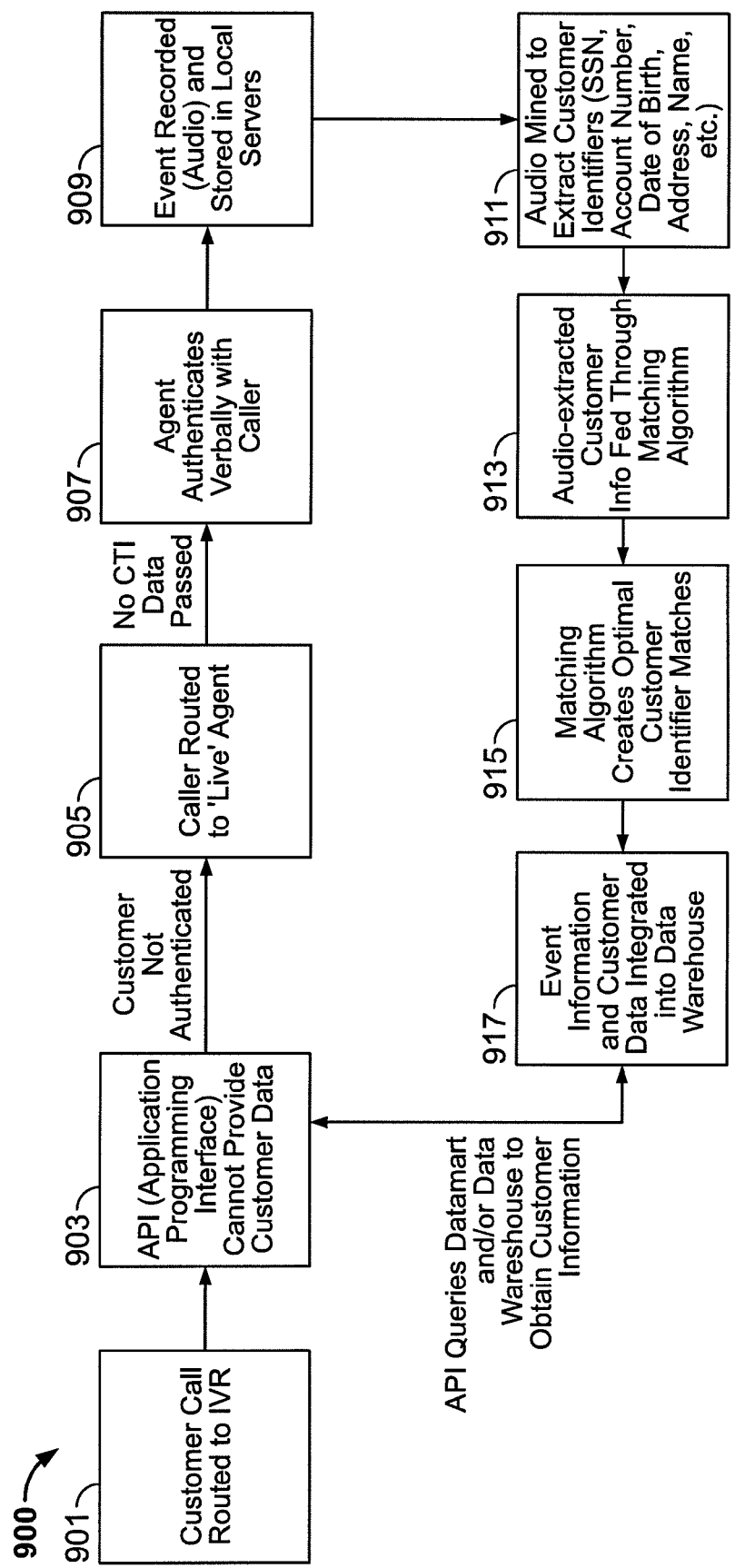
FIG. 9 shows a process for integrating data from a business support unit with data from a data warehouse when computer telephone integration information is not available in accordance with an aspect of the invention.

FIG. 9 shows process 900 for integrating data from a business support unit with data from a data warehouse when computer telephone integration information is not available in accordance with an aspect of the invention. Process 900 is similar with process 800; however, no CTI data can be obtained in steps 903 and 905. The agent authenticates the caller in step 907, and the recorded conversation is stored in step 909. In step 911, the stored audio recording is data mined to obtain customer identifiers (e.g., SSN account number, date of birth, and address) in step 911. In step 913, the extracted customer identifiers are provided to a matching algorithm. The matching algorithm in step 915 uses the extracted identifiers to identify the customer so that the unstructured data can be associated with the structured data of the identified customer in step 917.

Figure 10:
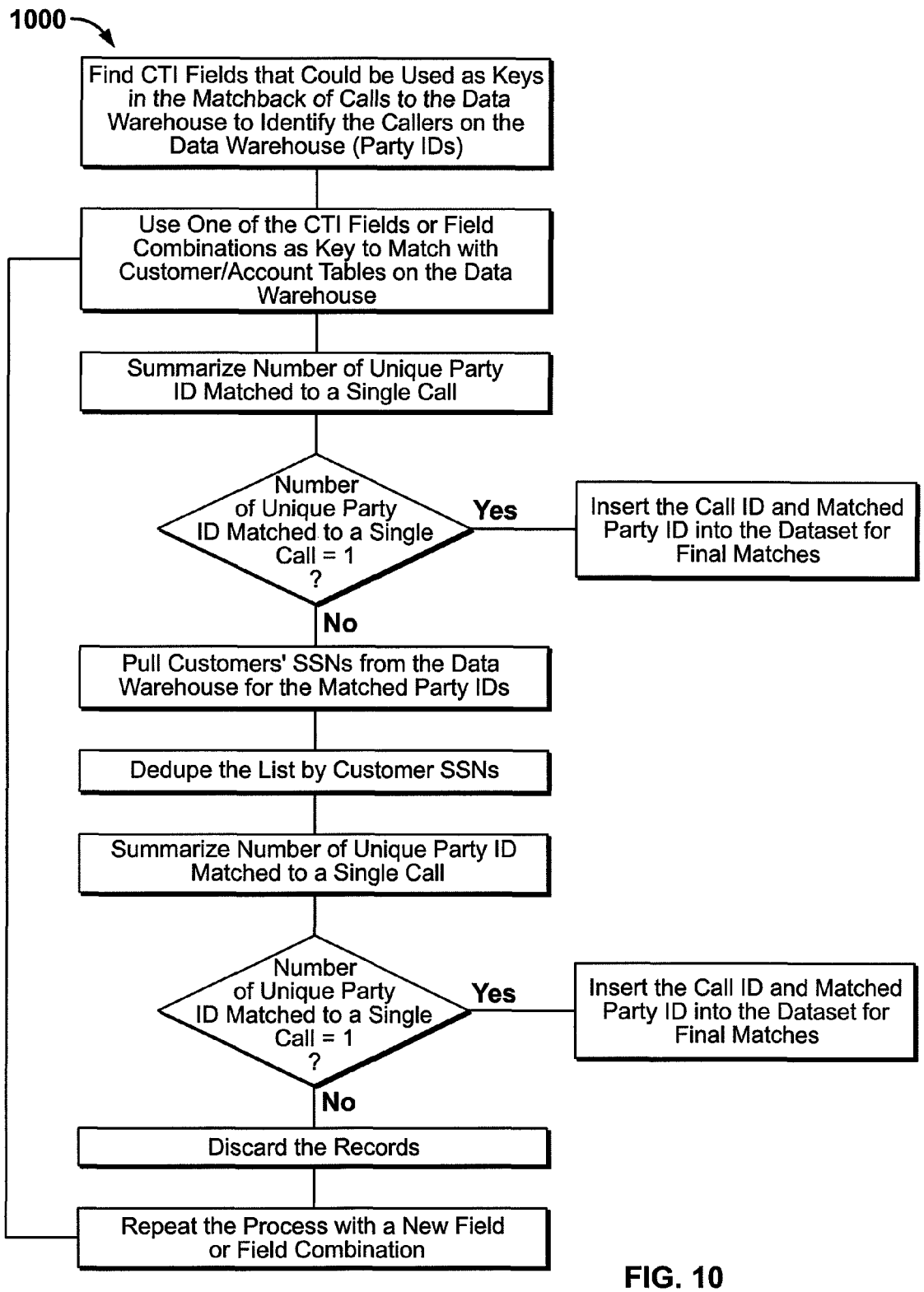
FIG. 10 shows a flow diagram for unstructured data CTI matchback to a data warehouse in accordance with an aspect of the invention.

FIG. 10 shows flow diagram 1000 for unstructured data CTI matchback to a data warehouse in accordance with an aspect of the invention. The matching algorithm ensures, to the extent possible, that a unique customer is associated with the captured structured data. The matching algorithm provides a confidence interval and uses combined individual elements to create a high likelihood of matching to a unique customer. For example, the data warehouse environment may contain multiple party id's for certain customers. In some cases, the same customer may have more than 1 party id associated with the record in the data warehouse. This multiplicity may result for different reasons: timing of the data refresh, customer data is not updated (e.g., due to moves by the customer), and absorption of legacy corporate data after a merger completes. For all these reasons, a customer may have multiple party id's or identifiers. The algorithm selects the most successful match.

Flow diagram 1000 finds CTI fields that could be used as keys in the matchback of calls to the data warehouse to identify the callers on the data warehouse (Party IDs) and uses one of the CTI fields or field combinations as key to match with customer/account tables on the data warehouse. Also, duplicated values may be narrowed down to a single, unique value (in reference to "dedupe").

FIG. 11 shows an example of unstructured data from a collection of calls that are matched by different data elements in accordance with an aspect of the invention.

FIG. 12 shows exemplary scenarios for merging data from a business support unit with data from a data warehouse in accordance with an aspect of the invention. Scenario 1201 corresponds to the situation in which no CTI information is available, while scenarios 1203 and 1205 correspond to the situation in which partial CTI information is available. In scenario 1201, the SSN, ANI, and account number are not available. Consequently, the recorded audio conversation is mined to extract the name and address, which are used as a combinational data key to the structured data in the data warehouse.

Figure 13:
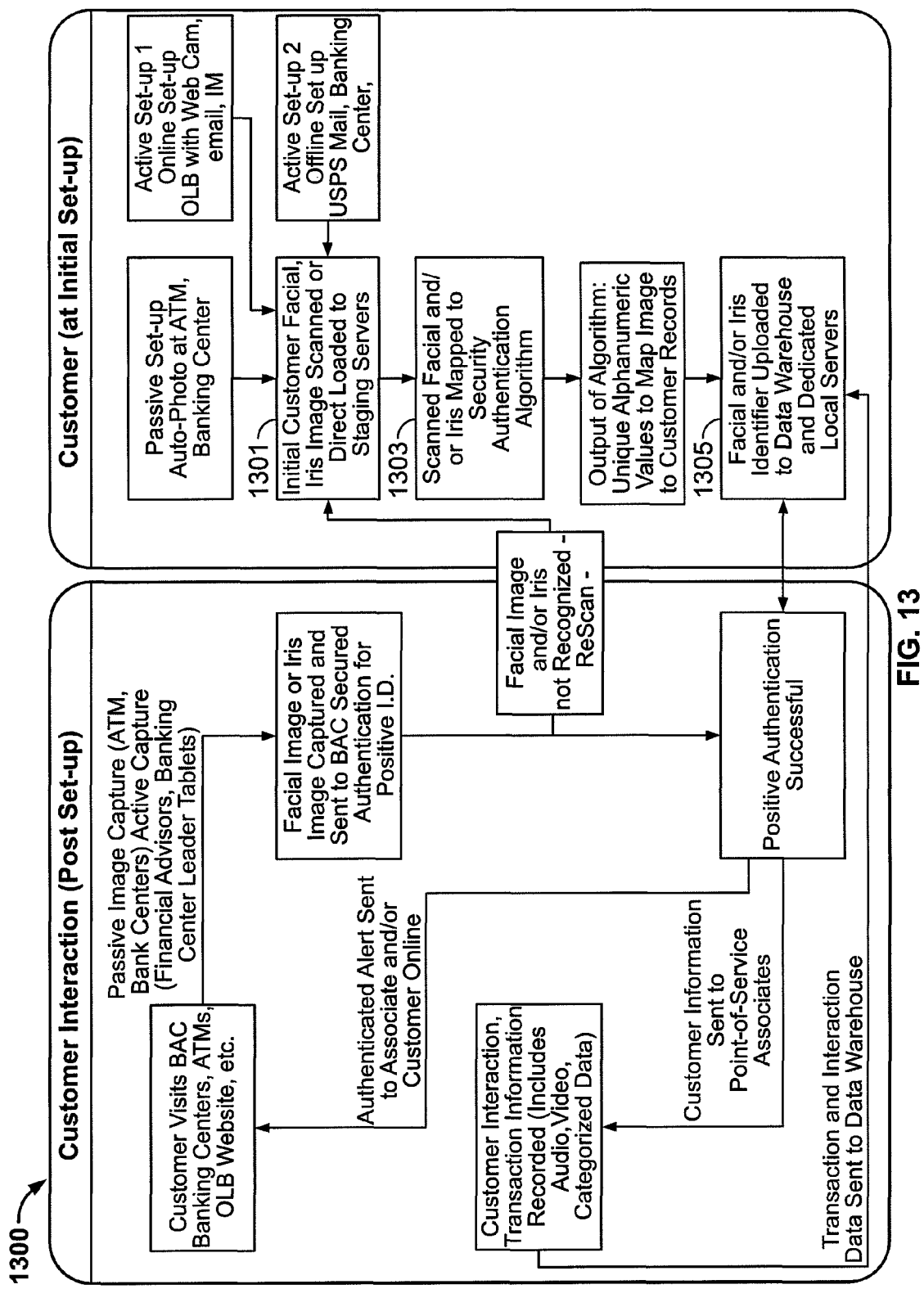
FIG. 13 shows a process for associating image data with data from a data warehouse in accordance with an aspect of the invention.

FIG. 13 shows process 1300 for associating image data with data from a data warehouse in accordance with an aspect of the invention. In step 1301 the customer's facial or iris image is scanned for authentication of the customer in subsequent transactions. in step 1303, a security authentication algorithm determines a unique alphanumeric value from the characteristics of the image. The alphanumeric value is then used to bind (integrate) the unstructured data (image data) to the customer's structured data in step 1305.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

We claim:

1. A computer-assisted method comprising:
    (a) receiving, at a computer system, unstructured data with incomplete integration information, the unstructured data being related to a customer;
    (b) creating a data key from the unstructured data, by the computer system, comprising analyzing the unstructured data to extract at least one customer identifier identifying the customer, wherein the data key is created using the at least one customer identifier;
    (c) integrating the unstructured data with structured data associated with the customer based on the data key, by the computer system, such that the unstructured data is associated with the structured data in a data storage system based on the data key;
    wherein the incomplete integration information includes partial information; and
    wherein (c) comprises merging the partial information with the at least one customer identifier to obtain the data key.

2. The method of claim 1, wherein (a) comprises:
    obtaining interface data for a customer connection; and
    determining that the interface data cannot be authenticated with customer-input data.

3. The method of claim 1 further comprising:
    (d) accessing the unstructured data based on the data key.

4. The method of claim 1, further comprising:
    (d) creating the data key further using an attribute of the unstructured data.

5. A computer-readable storage medium storing computer-executable instructions that, when executed, cause a processor to perform a method comprising:
    (a) receiving unstructured data with incomplete integration information, the unstructured data being related to a customer;
    (b) creating a data key from the unstructured data, comprising analyzing the unstructured data to extract at least one customer identifier identifying the customer, wherein the data key is created using the at least one customer identifier; and
    (c) integrating the unstructured data with structured data associated with the customer based on the data key, such that the unstructured data is associated with the structured data in a data storage system based on the data key, wherein (c) comprises merging partial information with the at least one customer identifier to obtain the data key, wherein the incomplete integration information includes the partial information.

6. The computer-readable medium of claim 5, said method further comprising:
    (d) mapping the at least one customer identifier only to one of a plurality of customers.

7. The computer-readable medium of claim 5, said method further comprising:
    (d) obtaining interface data for a customer connection; and
    (e) determining that the interface data cannot be authenticated with customer-input data.

8. The computer-readable medium of claim 5, said method further comprising:
    (d) accessing the unstructured data based on the data key.

9. The computer-readable medium of claim 5, said method further comprising:
    (d) creating the data key further using an attribute of the unstructured data.

10. An apparatus comprising:
    a data storage system;
    a tangible memory; and
    a computer processor comprising computer hardware coupled to the memory and configured to perform, based on instructions stored in the memory:

(a) receiving unstructured data with incomplete integration information, the unstructured data being related to a customer;
(b) creating a data key from the unstructured data, comprising analyzing the unstructured data to extract at least one customer identifier identifying the customer, wherein the data key is created using the at least one customer identifier;
(c) integrating the unstructured data with structured data associated with the customer based on the data key, such that the unstructured data is associated with the structured data in a data storage system based on the data key;
wherein the incomplete integration information includes partial information; and
wherein (c) comprises merging the partial information with the at least one customer identifier to obtain the data key.

11. The method of claim 1, wherein the unstructured data comprises at least one of audio data, video data, and image data, and wherein (b) comprises analyzing the at least one of audio data, video data, and image data to extract the at least one customer identifier.

12. The computer-readable medium of claim 5, wherein the unstructured data comprises at least one of audio data, video data, and image data, and wherein (b) comprises analyzing the at least one of audio data, video data, and image data to extract the at least one customer identifier.

13. The apparatus of claim 10, wherein the unstructured data comprises at least one of audio data, video data, and image data, and wherein (b) comprises analyzing the at least one of audio data, video data, and image data to extract the at least one customer identifier.

14. The method of claim 1, wherein the data storage system includes multiple stored customer identifiers corresponding to the customer, and wherein (c) further comprises:
matching the at least one customer identifier to a selected customer identifier of the multiple stored customer identifiers, wherein the selected customer identifier is selected by the computer system by analyzing data in the data storage system to select the most successful match.

15. The computer-readable medium of claim 5, wherein the data storage system includes multiple stored customer identifiers corresponding to the customer, and wherein (c) further comprises:
matching the at least one customer identifier to a selected customer identifier of the multiple stored customer identifiers, wherein the selected customer identifier is selected by the computer system by analyzing data in the data storage system to select the most successful match.

16. The apparatus of claim 10, wherein the data storage system includes multiple stored customer identifiers corresponding to the customer, and wherein (c) further comprises:
matching the at least one customer identifier to a selected customer identifier of the multiple stored customer identifiers, wherein the selected customer identifier is selected by the computer system by analyzing data in the data storage system to select the most successful match.

17. A computer-assisted method comprising:
(a) receiving, at a computer system, unstructured data with incomplete integration information, the unstructured data being related to a customer;
(b) creating a data key from the unstructured data, by the computer system, comprising analyzing the unstructured data to extract at least one customer identifier identifying the customer, wherein the data key is created using the at least one customer identifier;
(c) integrating the unstructured data with structured data associated with the customer based on the data key, by the computer system, such that the unstructured data is associated with the structured data in a data storage system based on the data key;
wherein all of the integration information is unknown; and
wherein (c) comprises matching the at least one customer identifier to obtain at least one optimal customer identifier and creating the data key from the at least one optimal customer identifier.

18. A computer-readable storage medium storing computer-executable instructions that, when executed, cause a processor to perform a method comprising:
(a) receiving unstructured data with incomplete integration information, the unstructured data being related to a customer;
(b) creating a data key from the unstructured data, comprising analyzing the unstructured data to extract at least one customer identifier identifying the customer, wherein the data key is created using the at least one customer identifier;
(c) integrating the unstructured data with structured data associated with the customer based on the data key, such that the unstructured data is associated with the structured data in a data storage system based on the data key;
(d) matching the at least one customer identifier to obtain at least one optimal customer identifier, wherein all of the integration information is unknown; and
(e) creating the data key from the at least one optimal customer identifier.

19. An apparatus comprising:
a data storage system;
a tangible memory; and
a computer processor comprising computer hardware coupled to the memory and configured to perform, based on instructions stored in the memory:
(a) receiving unstructured data with incomplete integration information, the unstructured data being related to a customer;
(b) creating a data key from the unstructured data, comprising analyzing the unstructured data to extract at least one customer identifier identifying the customer, wherein the data key is created using the at least one customer identifier;
(c) integrating the unstructured data with structured data associated with the customer based on the data key, such that the unstructured data is associated, with the structured data in a data storage system based on the data key;
wherein all of the integration information is unknown; and
wherein (c) comprises matching the at least one customer identifier to obtain at least one optimal customer identifier and creating the data key from the at least one optimal customer identifier.

* * * * *